(12) United States Patent
He (10) Patent No.: US 12,507,673 B1
(45) Date of Patent: Dec. 30, 2025

(54) BIRD FEEDER

(71) Applicant: Baorong He, Guangdong (CN)

(72) Inventor: Baorong He, Guangdong (CN)

( * ) Notice: Subject to any disclaimer, the term of this patent is extended or adjusted under 35 U.S.C. 154(b) by 0 days.

(21) Appl. No.: 19/088,992

(22) Filed: Mar. 25, 2025

(30) Foreign Application Priority Data

Sep. 23, 2024 (CN) .......................... 202422316001.9

(51) Int. Cl.
*A01K 39/014* (2006.01)

(52) U.S. Cl.
CPC .................................. *A01K 39/014* (2013.01)

(58) Field of Classification Search
CPC ........ A01K 31/00; A01K 31/06; A01K 31/08; A01K 31/12; A01K 31/14; A01K 39/00; A01K 39/01; A01K 39/014
See application file for complete search history.

(56) References Cited

U.S. PATENT DOCUMENTS

| | | | | |
|---|---|---|---|---|
| 2,524,502 | A * | 10/1950 | Wilkinson | A01K 39/012 119/57.9 |
| 3,717,126 | A * | 2/1973 | Falcone et al. | A01K 39/012 119/52.4 |
| 3,774,576 | A * | 11/1973 | Moore | A01K 1/03 119/480 |
| 5,452,681 | A * | 9/1995 | Ho | A01K 31/08 119/491 |
| 5,533,466 | A * | 7/1996 | Kohus | A01K 31/06 119/459 |
| 7,827,939 | B2 * | 11/2010 | Yang | A01K 31/08 119/474 |
| 11,871,724 | B2 * | 1/2024 | Zhang | A01K 1/033 |
| 11,985,958 | B1 * | 5/2024 | Moody | A01K 39/01 |
| 2006/0225663 | A1 * | 10/2006 | Chiang | A01K 63/003 119/452 |
| 2008/0210172 | A1 * | 9/2008 | Waikas | A01K 39/012 119/51.01 |
| 2009/0071408 | A1 * | 3/2009 | Wechsler | A01K 39/012 119/51.01 |
| 2010/0263598 | A1 * | 10/2010 | Vosbikian | A01K 39/014 119/61.1 |

(Continued)

FOREIGN PATENT DOCUMENTS

| | | | | |
|---|---|---|---|---|
| CA | 2698901 A1 * | 10/2010 | | A01K 39/012 |
| DE | 102018104461 B4 * | 2/2019 | | A01K 39/014 |

OTHER PUBLICATIONS

Birdream bird feeder. Retrieved from amazon.co.uk (Year: 2024).*

*Primary Examiner* — Monica L Perry
*Assistant Examiner* — Aaron M Rodziwicz (57) ABSTRACT

A bird feeder including a barrel assembly, a tray assembly and a cover assembly, where the barrel assembly is used for containing bird feeds, the barrel assembly includes a plurality of upright posts arranged at intervals in a ring shape and a plurality of panels, and the panels are detachably inserted between every two adjacent upright posts respectively; the tray assembly is connected to a lower portion of the barrel assembly, the tray assembly is used for receiving and distributing the bird feeds in the barrel assembly, and the tray assembly includes at least one feeding opening for distributing the bird feeds; and the cover assembly detachably covers an upper portion of the barrel assembly, and the cover assembly is used for preventing an object from entering the barrel assembly.

8 Claims, 11 Drawing Sheets

(56) References Cited

U.S. PATENT DOCUMENTS

| | | | |
|---|---|---|---|
| 2012/0055410 A1* | 3/2012 | Cote | ................. A01K 39/0113 |
| | | | 119/52.3 |
| 2014/0116344 A1* | 5/2014 | Holscher | ................ A01K 5/015 |
| | | | 119/51.01 |
| 2023/0404028 A1* | 12/2023 | Carter | ................. A01K 5/0225 |

\* cited by examiner

BIRD FEEDER

CROSS REFERENCE TO RELATED APPLICATIONS

The present application claims the priority of Chinese patent application No. 202422316001.9, filed on Sep. 23, 2024, and contents of which are incorporated herein by reference.

TECHNICAL FIELD

The present disclosure relates to the technical field of bird feeding devices, in particular to a bird feeder.

BACKGROUND

With the rapid development of the current society, wild animals are getting out of sight gradually, and urban residents become farther away from the nature and feel removed with the nature. In order to get closer to the nature, many animal lovers and birdwatchers usually keep some birds. For them, bird feeders have been around for quite a long time.

However, the existing bird feeder is composed of a huge single component that is difficult to disassemble or split, which makes the interior of the bird feeder difficult to clean and cannot satisfy the demand for clean feed provision for birds. Moreover, the existing bird feeder is large overall in size and occupies large space since it cannot be dissembled or split into several components. As a result, it is difficult to store, package and transport the bird feeder conveniently.

SUMMARY

An objective of the present disclosure is to provide a bird feeder for solving at least one of the technical problems in the prior art.

In order to achieve the objective, a technical solution of the present disclosure provides a bird feeder. The bird feeder includes:
  a barrel assembly used for containing bird feeds, where the barrel assembly includes a plurality of upright posts arranged at intervals in a ring shape and a plurality of panels, and the panels are detachably inserted between every two adjacent upright posts respectively;
  a tray assembly, where the tray assembly is connected to a lower portion of the barrel assembly, the tray assembly is used for receiving and distributing the bird feeds in the barrel assembly, and the tray assembly includes at least one feeding opening for distributing the bird feeds; and
  a cover assembly, where the cover assembly detachably covers an upper portion of the barrel assembly, and the cover assembly is used for preventing an object from entering the barrel assembly.

Further, a lower end of the upright post is provided with a first limit post, the first limit post is composed of a plurality of first elastic flaps arranged oppositely, a plurality of first limit holes provided at intervals in a ring shape are provided in the tray assembly, and the first limit posts of the plurality of upright posts are inserted into the plurality of first limit holes in one-to-one correspondence respectively.

Further, an upper end of the upright post is provided with a second limit post, the second limit post is composed of a plurality of second elastic flaps arranged oppositely, a plurality of second limit holes provided at intervals in a ring shape are provided in the cover assembly, and the second limit posts of the plurality of upright posts are inserted into the plurality of second limit holes in one-to-one correspondence respectively.

Further, a plurality of first insertion recesses provided in a ring shape are provided in the tray assembly, the first insertion recesses are provided between every two adjacent upright posts respectively, and lower ends of the panels are inserted into the first insertion recesses respectively.

Further, one of the first insertion recess and the lower end of the panel is provided with a first convex buckle, the other one of the first insertion recess and the lower end of the panel is provided with a first recess, and the lower end of the panel is fixedly inserted into the first insertion recess through snap fitting between the first convex buckle and the first recess.

Further, the cover assembly comprises a top cover and a ring cover that are detachably connected to each other; upper ends of the plurality of upright posts are detachably connected to the ring cover, and a plurality of second insertion recesses provided in a ring shape are provided in the ring cover; and the second insertion recesses are located between every two adjacent upright posts respectively, and upper ends of the panels are inserted into the second insertion recesses respectively.

Further, the second insertion recess is arranged through an upper surface and a lower surface of the ring cover, a plurality of protrusions arranged in a ring shape are arranged in the top cover, and the protrusions are pressed against the upper ends of the panels respectively.

Further, a ring wall extends at a lower portion of the top cover, a protruding buckle is arranged on the ring wall, a rotation snap-in recess is provided in an outer edge of the ring cover, and an end of the rotation snap-in recess is provided with an opening, such that the protruding buckle is rotationally snapped in the rotation snap-in recess through the opening by rotating the ring wall relative to the ring cover.

Further, a plurality of first snap-in portions arranged at intervals in a ring shape are arranged on the tray assembly, and the lower ends of the plurality of upright posts all protrude inwards to form first bumps, such that the first bumps are embedded in the first snap-in portions to position the upright posts.

Further, the tray assembly comprises a tray body and a ring body that are detachably connected to each other, the barrel assembly is arranged on the ring body to form a plurality of feeding openings between the ring body and the tray body, and the plurality of feeding openings are provided around the ring body.

As can be seen from the technical solution, according to the bird feeder of the present disclosure, the barrel assembly can be split into the plurality of upright posts and the plurality of panels, such that space occupied by the bird feeder is reduced, and storage, package and transportation are convenient. During fitting, the plurality of upright posts are inserted in the tray assembly at intervals in a ring shape at first, and then the panels are detachably inserted between every two adjacent upright posts respectively, thus defining the barrel assembly. The tray assembly is used for receiving and distributing the bird feeds in the barrel assembly, the tray assembly includes at least one feeding opening for distributing the bird feeds, such that birds can eat the bird feeds through the feeding opening. In addition, the barrel assembly and the tray assembly can be split, and the barrel assembly and the cover assembly can be split, thus cleaning the interior of the bird feeder conveniently.

BRIEF DESCRIPTION OF THE DRAWINGS

In order to illustrate the technical solution in embodiments of the present disclosure more clearly, the following briefly introduces accompanying drawings used in the description of the embodiments. Obviously, the accompanying drawings in the following description are only some embodiments of the present disclosure. Those of ordinary skill in the art can obtain other accompanying drawings from these accompanying drawings without any creative efforts.

DETAILED DESCRIPTIONS OF THE EMBODIMENTS

In order to make those skilled in the art better understand the technical solution of the present disclosure, the technical solution in the embodiments of the present disclosure will be clearly and completely described below with reference to accompanying drawings in the embodiments of the present disclosure. Obviously, the described embodiments are only a part of the embodiments of the present disclosure, but not all of the embodiments. Based on the embodiments of the present disclosure, all other embodiments obtained by those skilled in the art without any creative efforts fall within the protection scope of the present disclosure.

With reference to FIG. 1 to FIG. 11, this example provides a bird feeder. The bird feeder includes a barrel assembly 100, a tray assembly 200 and a cover assembly 300. The barrel assembly 100 is used for containing bird feeds, the barrel assembly 100 includes a plurality of upright posts 110 arranged at intervals in a ring shape and a plurality of panels 120, and the panels 120 are detachably inserted between every two adjacent upright posts 110 respectively. The tray assembly 200 is connected to a lower portion of the barrel assembly 100, the tray assembly 200 is used for receiving and distributing the bird feeds in the barrel assembly 100, and the tray assembly 200 includes at least one feeding opening 230 for distributing the bird feeds. The cover assembly 300 detachably covers an upper portion of the barrel assembly 100, and the cover assembly 300 is used for preventing an object from entering the barrel assembly 100. In this way, birds can eat the bird feeds in the bird feeder through the feeding opening 230.

It can be seen that according to the bird feeder of this example, the barrel assembly 100 can be split into the plurality of upright posts 110 and the plurality of panels 120, such that space occupied by the bird feeder is reduced, and storage, package and transportation are convenient. During assembly, the plurality of upright posts 110 are inserted in the tray assembly 200 at intervals in a ring shape at first, and then the panels 120 are detachably inserted between every two adjacent upright posts 110 respectively, thus defining the barrel assembly 100. The tray assembly 200 is used for receiving and distributing the bird feeds in the barrel assembly 100, the tray assembly 200 includes at least one feeding opening 230 for distributing the bird feeds, such that the birds can eat the bird feeds through the feeding opening 230. In addition, the barrel assembly 100 and the tray assembly 200 can be split, and the barrel assembly 100 and the cover assembly 300 can be split, thus cleaning the interior of the bird feeder conveniently.

Figure 6:
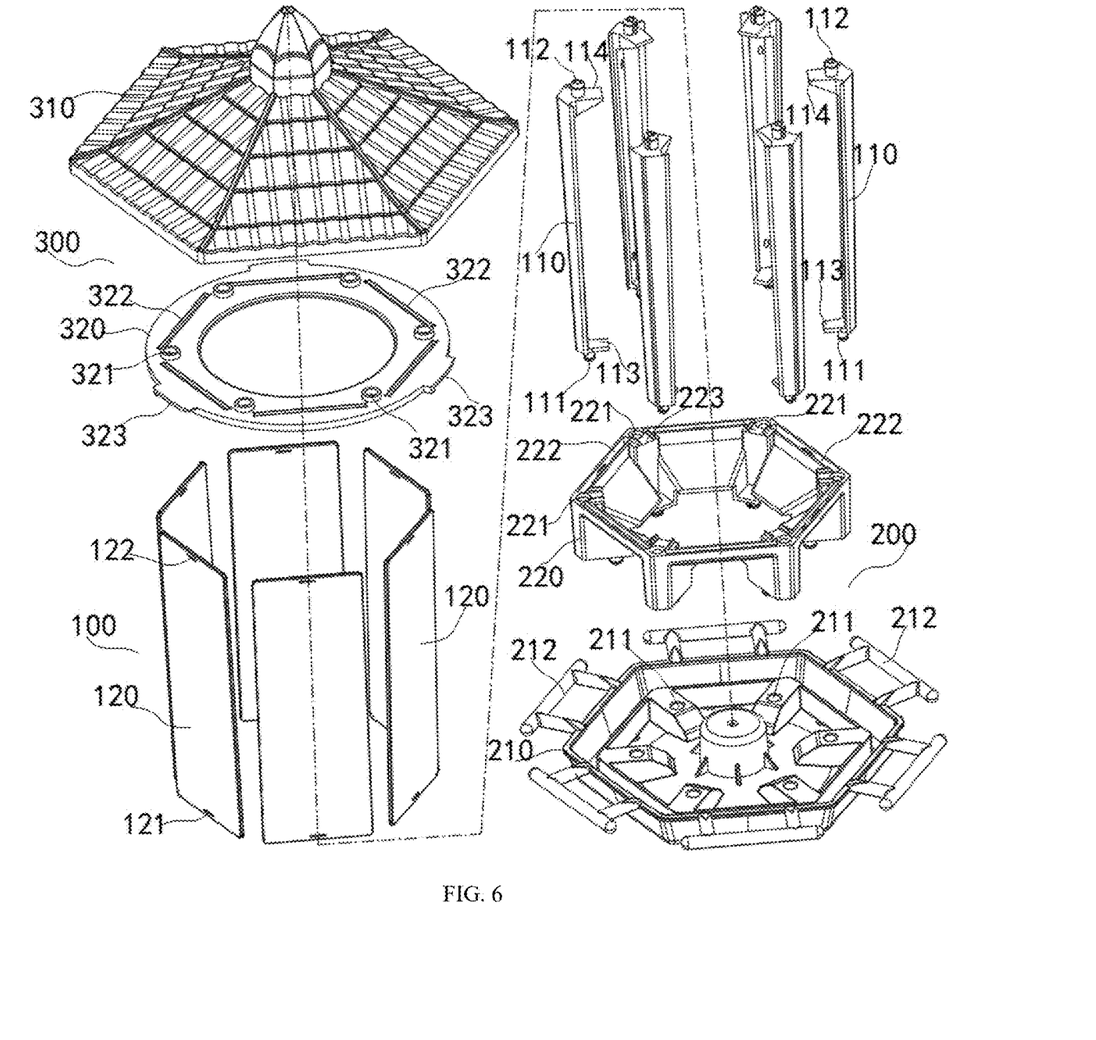
FIG. 6 is a structural exploded view of a bird feeder according to an example of the present disclosure.
Figure 7:
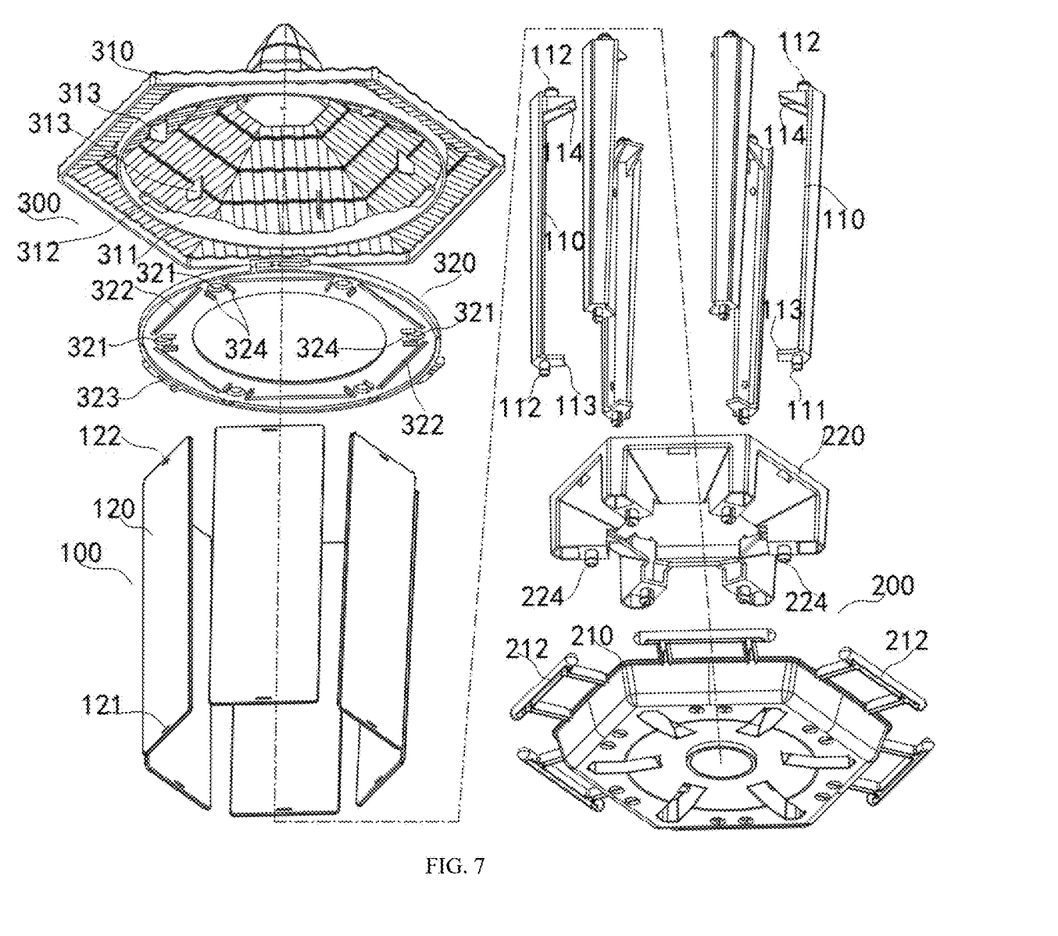
FIG. 7 is a structural exploded view of a bird feeder from another perspective according to an example of the present disclosure.
Figure 8:
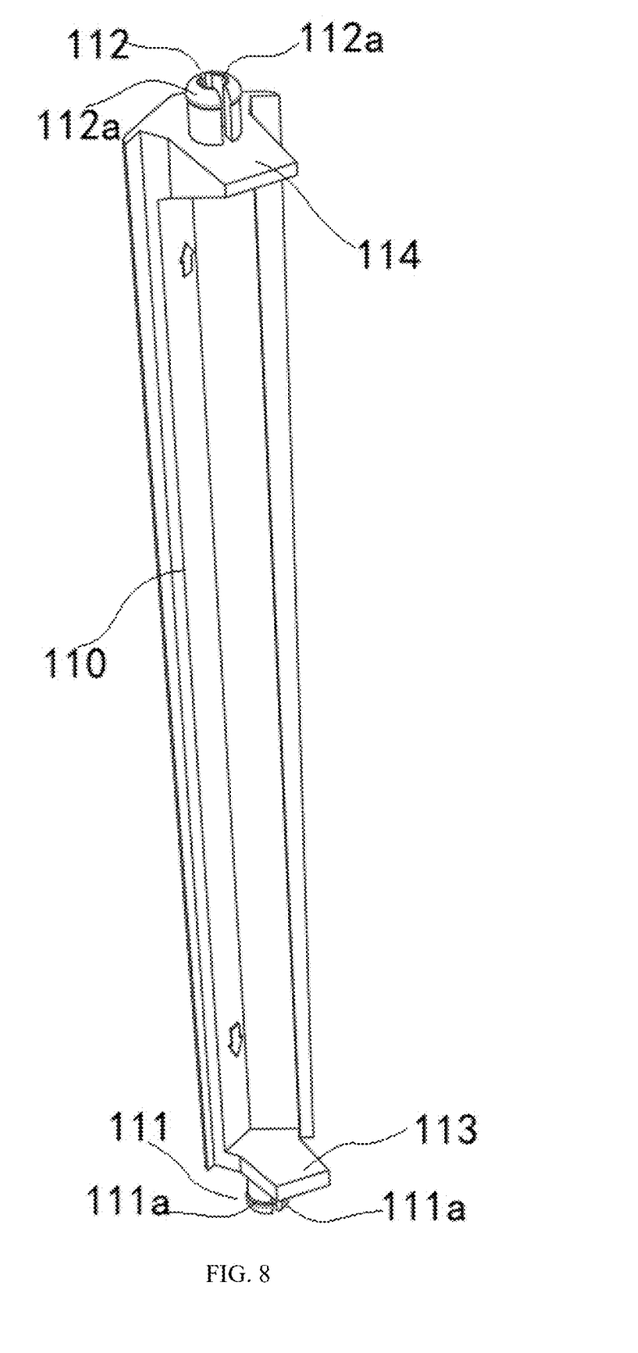
FIG. 8 is a schematic structural diagram of an upright post according to an example of the present disclosure.

In this example, as shown in FIG. 6 to FIG. 8, a lower end of the upright post 110 is provided with a first limit post 111, the first limit post 111 is composed of a plurality of first elastic flaps 111a arranged oppositely, a plurality of first limit holes 221 provided at intervals in a ring shape are provided in the tray assembly 200, and the first limit posts 111 of the plurality of upright posts 110 are inserted into the plurality of first limit holes 221 in one-to-one correspondence respectively. In this way, the first limit post 111 is in inserted matching with the first limiting hole 221, rapid assembly is implemented, a structure is simple, convenient disassembly and cleaning are implemented, and machining difficulty and production cost are low.

As shown in FIG. 6 to FIG. 8, the first limit post 111 is generally cylindrical, and a diameter of a head of the first limit post 111 is greater than a diameter of a main body of the first limit post 111. With such arrangement, the head of the first limit post 111 abuts against an end face of the first limit hole 221, to restrain the first limit post 111 from being separated from the first limit hole 221, and the structure is stable and reliable. Specifically, when the head of the first limit post 111 is inserted in the first limit hole 221, the plurality of first elastic flaps 111a move elastically close to one another, and when the head of the first limit post 111 passes through the first limit hole 221, the plurality of first elastic flaps 111a move elastically away from one another, such that the head of the first limit post 111 abuts against the end face of the first limit hole 221 and positioning is implemented.

Specially, as shown in FIG. 6 to FIG. 8, an upper end of the upright post 110 is provided with a second limit post 112, the second limit post 112 is composed of a plurality of second elastic flaps 112a arranged oppositely, a plurality of second limit holes 321 provided at intervals in a ring shape are provided in the cover assembly 300, and the second limit posts 112 of the plurality of upright posts 110 are inserted into the plurality of second limit holes 321 in one-to-one correspondence respectively. In this way, the first limit post 111 is in inserted matching with the first limit hole 221, the cover assembly 300 is rapidly fitted to the barrel assembly 100, a structure is simple, convenient disassembly, cleaning and storage are implemented, and machining difficulty and production cost are low.

As shown in FIG. 6 to FIG. 8, the second limit post 112 is generally cylindrical, and a diameter of a head of the second limit post 112 is greater than a diameter of a main body of the second limit post 112. With such arrangement, the head of the second limit post 112 abuts against an end face of the second limit hole 321, to restrain the second limit post 112 from being separated from the second limit hole 321, and the structure is stable and reliable. Specifically, when the head of the second limit post 112 is inserted in the second limit hole 321, the plurality of second elastic flaps 112a move elastically close to one another, and when the head of the second limit post 112 passes through the first limit hole 321, the plurality of second elastic flaps 112a move elastically away from one another, such that the head of the second limit post 112 abuts against the end face of the second limit hole 321 and positioning is implemented.

It should be noted that, as shown in FIG. 6 to FIG. 8, the first limit post 111, the second limit post 112 and the upright post 110 are integrally formed of a plastic material, and the panel 120 is made of a transparent material, specifically, transparent plastic or glass. Through the transparent panel 120, the remaining amount of the bird feeds in the bird feeder can be visually checked, such the bird feeds are added in time.

Figure 9:
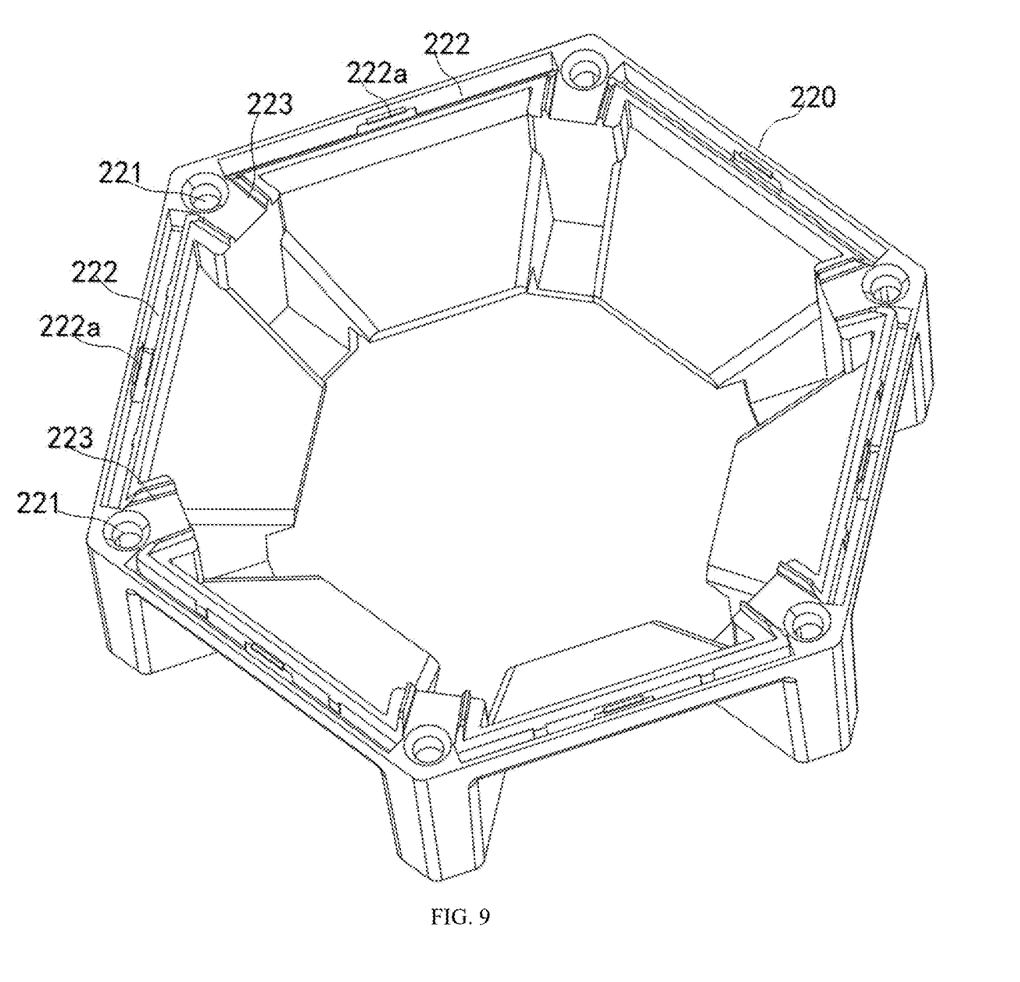
FIG. 9 is a schematic structural diagram of a ring body according to an example of the present disclosure.

Further, as shown in FIG. 6 and FIG. 9, a plurality of first insertion recesses 222 provided in a ring shape are provided in the tray assembly 200, the first insertion recesses 222 are provided between every two adjacent upright posts 110 respectively, and lower ends of the panels 120 are inserted into the first insertion recesses 222 respectively. With such arrangement, the panel 120 is mounted between two adjacent columns 110 by being inserted into the first insertion recess 222 of the tray assembly 200, a structure is simple, and convenient disassembly and assembly are convenient.

Figure 5:
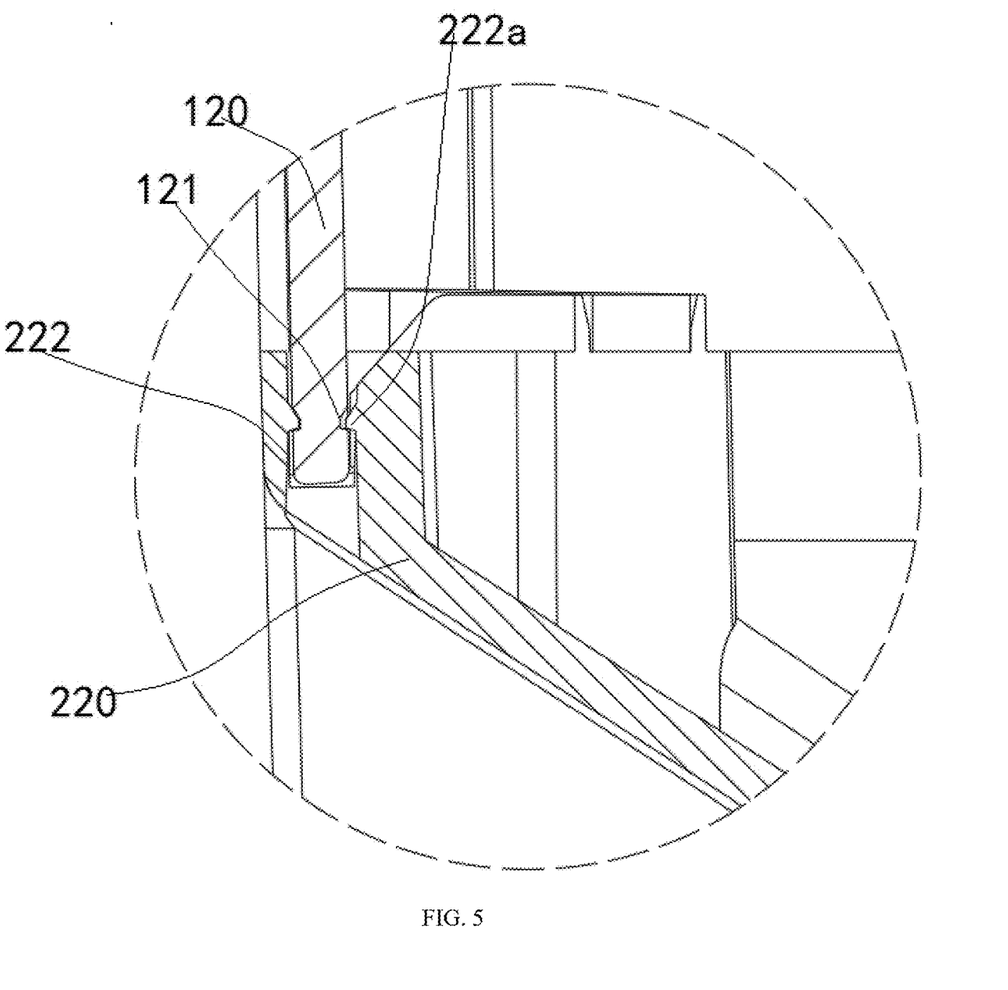
FIG. 5 is an enlarged schematic diagram of portion C in FIG. 3 according to an example of the present disclosure.

Further, as shown in FIG. 5 and FIG. 6, one of the first insertion recess 222 and the lower end of the panel 120 is provided with a first convex buckle 222a, the other one of the first insertion recess 222 and the lower end of the panel 120 is provided with a first recess 121, and the lower end of the panel 120 is fixedly inserted into the first insertion recess 222 through snap fitting between the first convex buckle 222a and the first recess 121. With such arrangement, the lower end of the panel 120 is prevented from being accidentally separated from the first insertion slot 222 through snap fitting between the first convex buckle 222a and the first recess 121, thus improving structural stability and reliability.

In this example, as shown in FIG. 6 to FIG. 7, the cover assembly 300 includes a top cover 310 and a ring cover 320 that are detachably connected to each other, the ring cover 320 is provided with a center hole, upper ends of the plurality of upright posts 110 are detachably connected to the ring cover 320, and a plurality of second insertion recesses 322 provided in a ring shape are provided in the ring cover 320. The second insertion recesses 322 are located between every two adjacent upright posts 110 respectively, upper ends of the panels 120 are inserted into the second insertion recesses 322 respectively, and the second limit hole 321 is provided in the ring cover 320. In this way, the cover body assembly 300 is split into the top cover 310 and the ring cover 320, the ring cover 320 is used to be fixedly connected to the upper end of the barrel assembly 100, and the top cover 310 covers the upper end of the barrel assembly 100, such that the bird feeds can be added into the barrel assembly 100 by removing the top cover 310.

Figure 4:
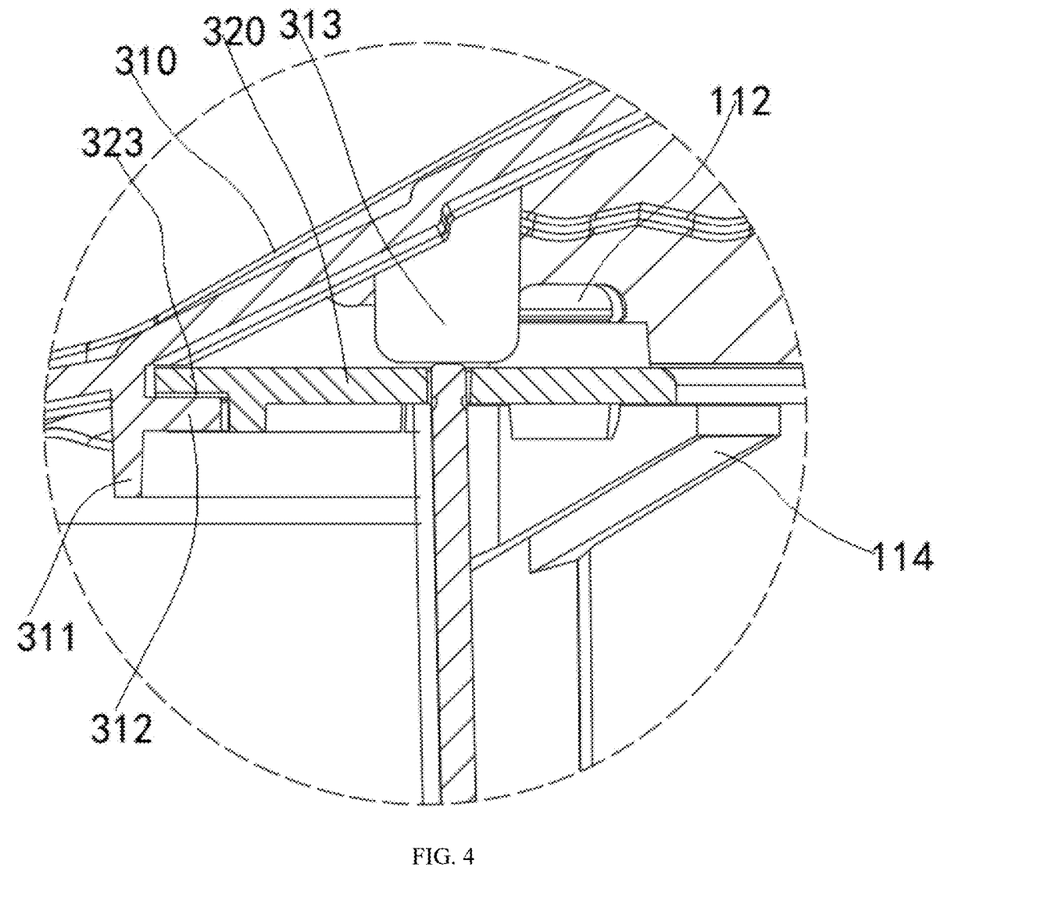
FIG. 4 is an enlarged schematic diagram of portion B in FIG. 3 according to an example of the present disclosure.

As shown in FIG. 4 and FIG. 6, the upper end of each panel 120 is provided with a second recess 122, a second convex buckle is correspondingly arranged in the second insertion recess 322, and the upper end of the panel 120 is fixedly inserted into the second insertion recess 322 through snap fitting between the second convex buckle and the second recess 122. With such arrangement, the condition that the panel 120 shakes in the second insertion recess 322 and generate abnormal noise is prevented through the snap fitting between the second convex buckle and the second recess 122, thus improving stability and reliability of the structure.

Specifically, as shown in FIG. 4 and FIG. 7, the second insertion recess 322 is arranged through an upper surface and a lower surface of the ring cover 320, a plurality of protrusions 313 arranged in a ring shape are arranged in the top cover 310, and the protrusions 313 are pressed against the upper ends of the panels 120 respectively, thus preventing the panels 120 from being separated from the second insertion recess 322. With such arrangement, when fitting, the lower ends of the plurality of upright posts 110 are inserted into the tray assembly 200, then, the upper ends of the plurality of upright posts 110 are inserted in the ring cover 320, then the panels 120 are inserted between two every two adjacent upright posts 110 through the second insertion recesses 322 respectively, and the lower ends of the panel 120 are inserted into the first insertion recesses 222 in the tray assembly 200 respectively. With such arrangement, the bird feeder can be split into a plurality of components, express package transportation and storage are convenient, and structural design is simple and reasonable, and assembly is convenient, rapid, stable and reliable.

Further, as shown in FIG. 4 and FIG. 7, a ring wall 311 extends at a lower portion of the top cover 310, a protruding buckle 312 is arranged on the ring wall 311, a rotation snap-in recess 323 is provided in an outer edge of the ring cover 320, and an end of the rotation snap-in recess 323 is provided with an opening, such that the protruding buckle 312 is rotationally snapped in the rotation snap-in recess 323 through the opening by rotating the ring wall 311 relative to the ring cover 320, and the top cover 310 covers the barrel assembly 100. When the top cover 310 needs to be removed, the convex buckle 312 can be disengaged from the opening of the rotation snap-in recess 323 by reversely rotating the top cover 310, such that the top cover 310 can be removed. Then the upper end of the barrel assembly 100 is opened, such that the bird feeds can be added into the barrel assembly 100.

Figure 11:
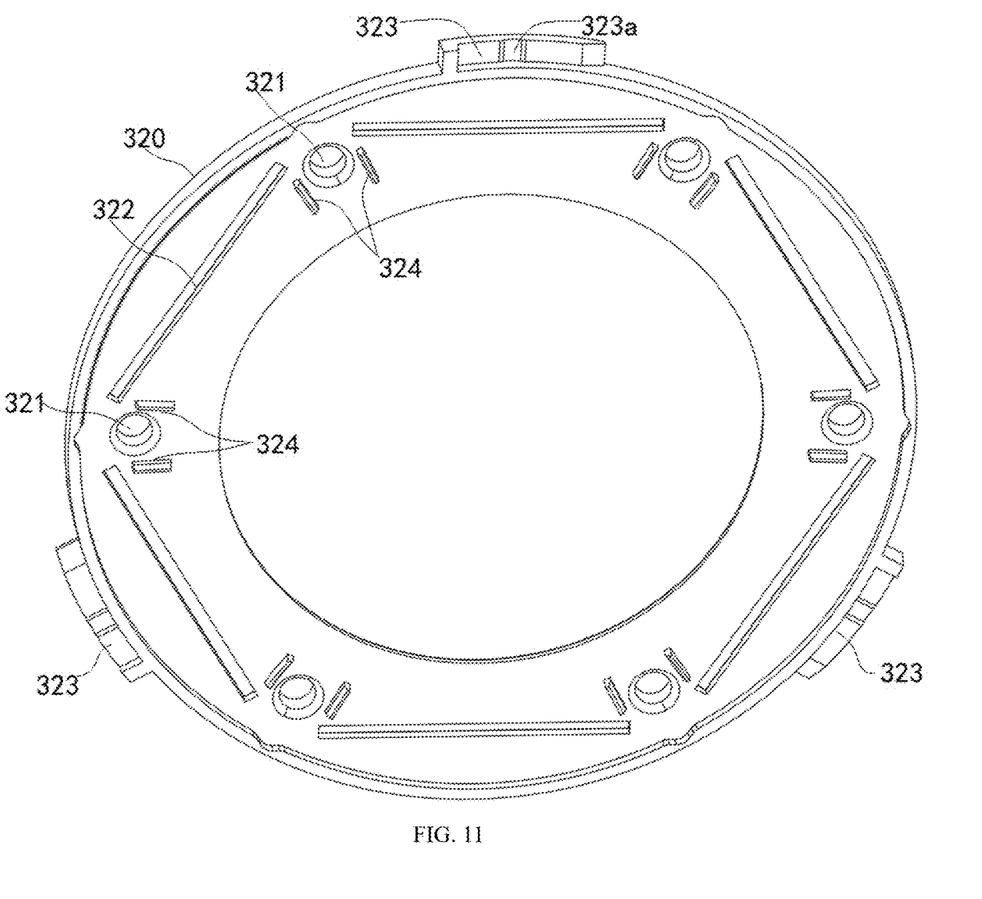
FIG. 11 is a schematic structural diagram of a ring cover according to an example of the present disclosure.

As shown in FIG. 7 and FIG. 11, in a preferred example, an inner wall of the rotation snap-in recess 323 is provided with a concave portion 323a, and the protruding buckle 312 is correspondingly provided with a convex portion. In this way, the convex portion and the concave portion 323a are in snap-fitted connection when the convex buckle 312 is rotationally snapped into the rotating slot 323, the convex buckle 312 is prevented from being accidentally separated from the rotating snap-in recess 323, and the stability and reliability of the structure are further improved.

In this example, as shown in FIG. 6 and FIG. 9, a plurality of first snap-in portions 223 arranged at intervals in a ring shape are arranged on the tray assembly 200, and the lower ends of the plurality of upright posts 110 all protrude inwards to form first bumps 113, such that the first bumps 113 are embedded in the first snap-in portions 223 to position the upright posts 110 circumferentially and prevent the upright posts 110 from shaking. The first snap-in portion 223 is composed of two first convex ribs arranged at an interval, and the first bump 113 is embedded between the two first convex ribs, thus implementing circumferential positioning of the upright post 110.

Specifically, as shown in FIG. 7 to FIG. 8, the upper ends of the plurality of upright posts 110 all protrude inwards to form second bump 114, and the lower surface of the ring cover 320 is provided with a plurality of second snap-in portions 324 arranged at intervals in a ring shape, such that the second bumps 114 are embedded in the second snap-in portions 324 to position the upright posts 110 circumferentially and prevent the upright posts 110 from shaking. The second snap-in portion 324 is composed of two second convex ribs arranged at an interval, and the second bump 114 is embedded between the two second convex ribs, thus implementing circumferential positioning of the upright post 110, and further improving the structural stability and reliability.

In this example, as shown in FIG. 6 to FIG. 7, the tray assembly 200 includes a tray body 210 and a ring body 220 that are detachably connected to each other, the barrel assembly 100 is arranged on the ring body 220 to form a plurality of feeding openings 230 between the ring body 220 and the tray body 210, and the plurality of feeding openings 230 are provided around the ring body 220. In this way, the feeding opening 230 is provided between the ring body 220 and the tray body 210, and the ring body 220 and the tray body 210 are detachably connected to each other, such that the feeding opening 230 is disassembled and opened conveniently for being cleaned.

Figure 10:
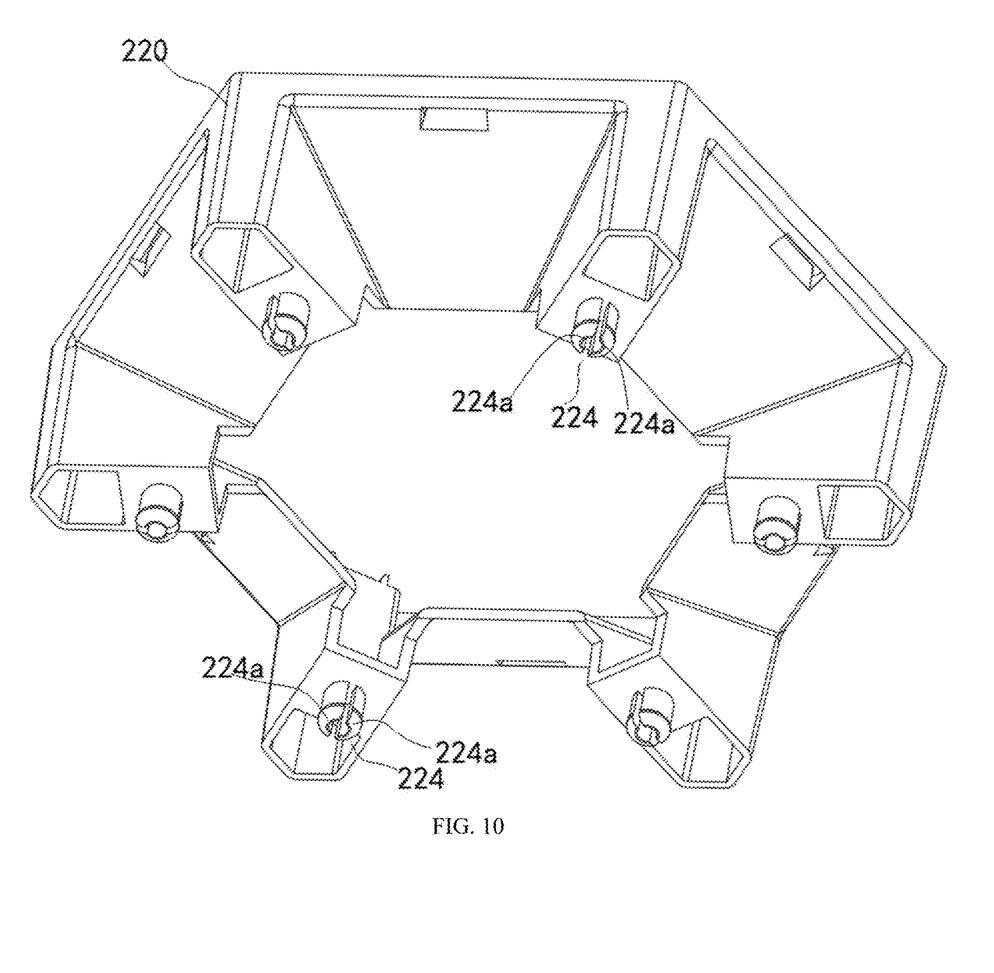
FIG. 10 is a schematic structural diagram of a ring body from another perspective according to an example of the present disclosure.

Specially, as shown in FIG. 6 and FIG. 10, a bottom of the ring body 220 is provided with a third limit post 224, the third limit post 224 is composed of a plurality of three elastic flaps 224a arranged oppositely, a plurality of third limit holes 211 provided at intervals in a ring shape are provided in the tray assembly 210, and the plurality of third limit posts 224 are inserted into the plurality of third limit holes 211 in one-to-one correspondence respectively, thus detachably connecting the ring body 220 to the tray body 210. In this way, the first limit post 224 is in inserted matching with the first limit hole 211, the ring body 220 is rapidly fitted to the tray body 210, a structure is simple, convenient disassembly, cleaning and storage are implemented, and machining difficulty and production cost are low.

As shown in FIG. 6 and FIG. 10, the third limit post 224 is generally cylindrical, and a diameter of a head of the third limit post 224 is greater than a diameter of a main body of the third limit post 224. With such arrangement, the head of the third limit post 224 abuts against an end face of the third limit hole 211, to restrain the third limit post 224 from being separated from the third limit hole 211, and the structure is stable and reliable. Specifically, when the head of the third limit post 224 is inserted in the third limit hole 211, the plurality of third elastic flaps 224a move elastically close to one another, and the head of the third limit post 224 can be inserted in the third limit hole 211, and when the head of the third limit post 224 passes through the third limit hole 211, the plurality of third elastic flaps 224a move elastically away from one another, such that the head of the third limit post 224 abuts against the end face of the third limit hole 211 and positioning is implemented.

Figure 1:
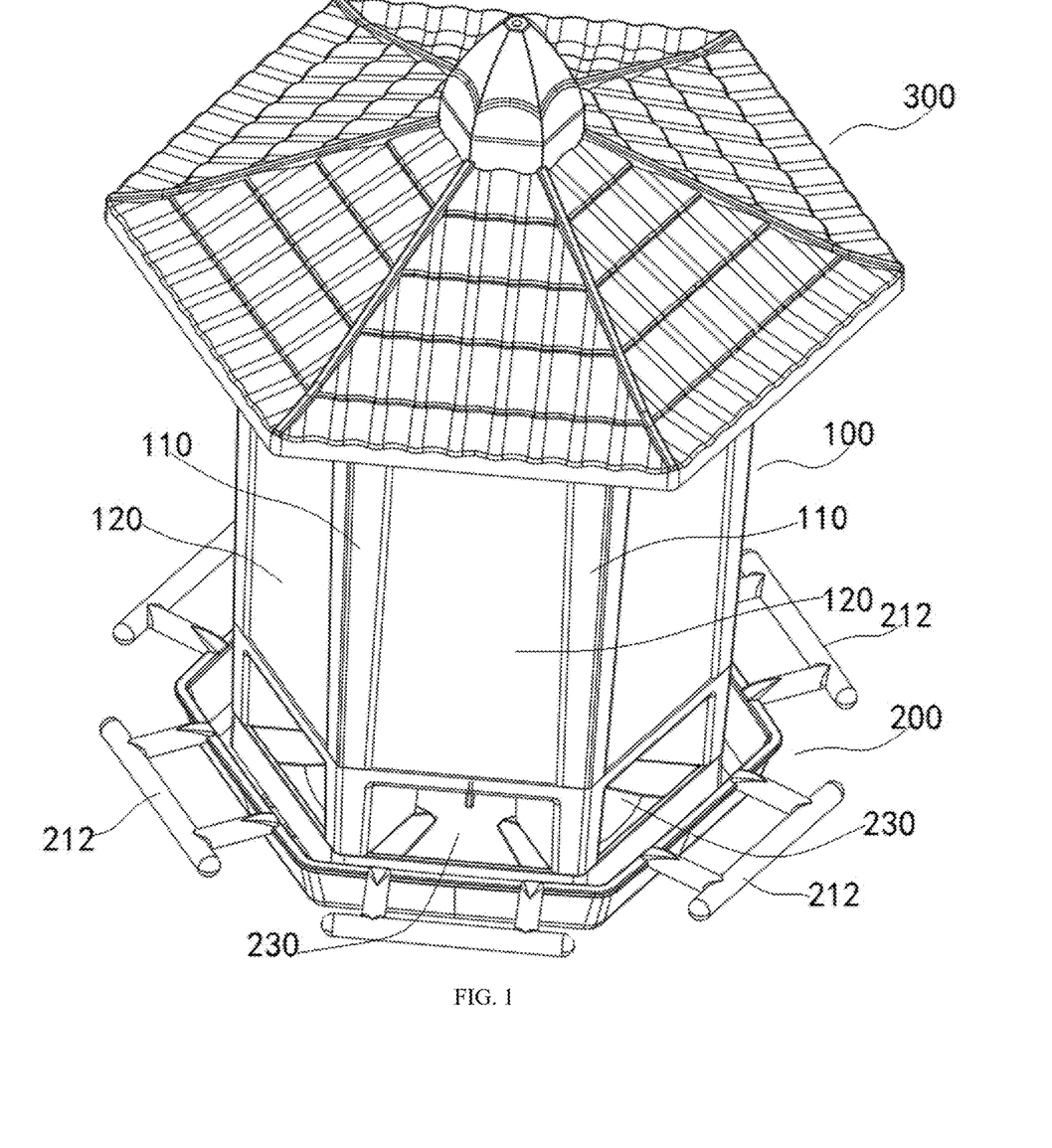
FIG. 1 is a perspective view of a bird feeder according to an example of the present disclosure.
Figure 2:
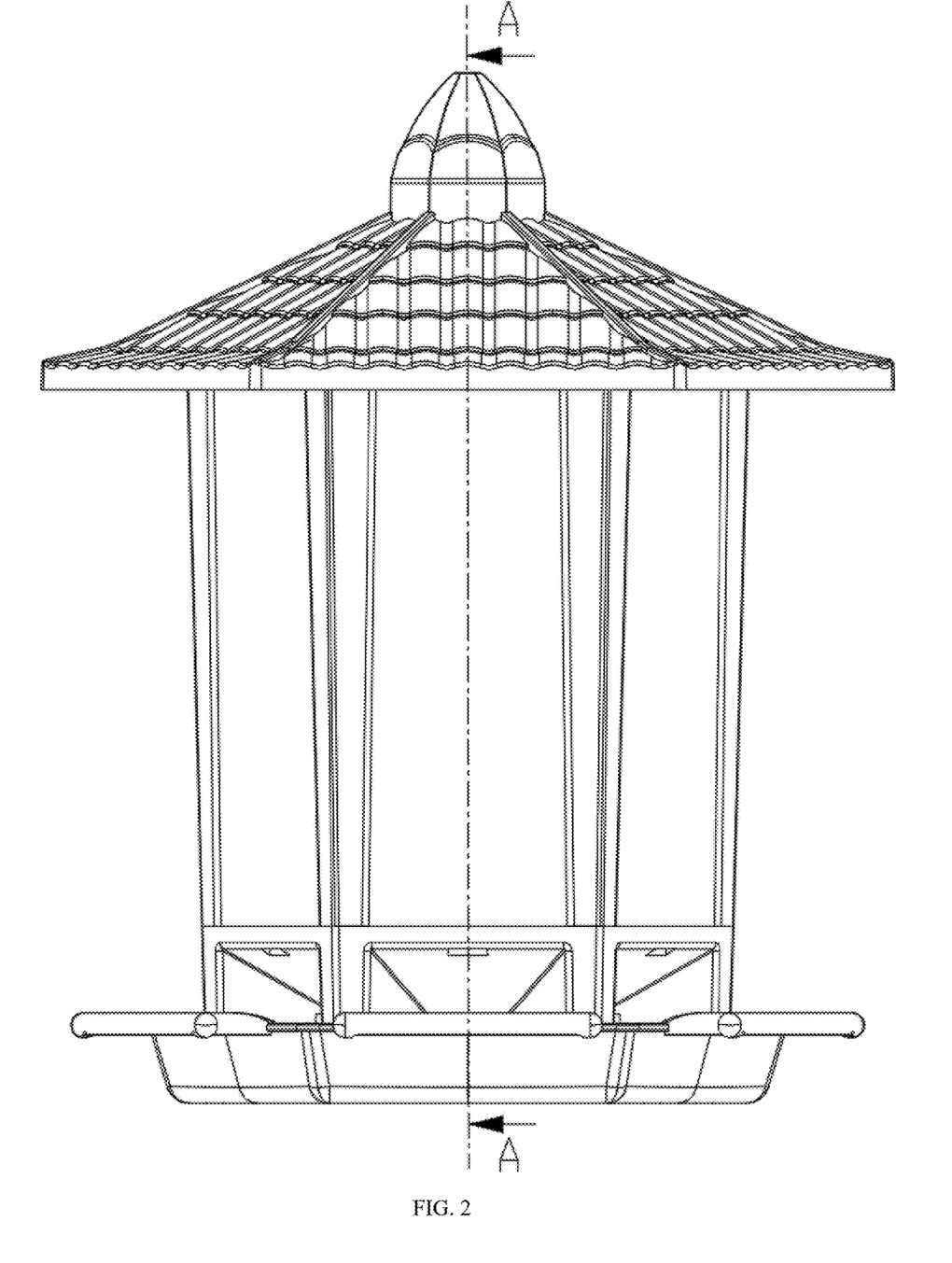
FIG. 2 is a front view of a bird feeder according to an example of the present disclosure.
Figure 3:
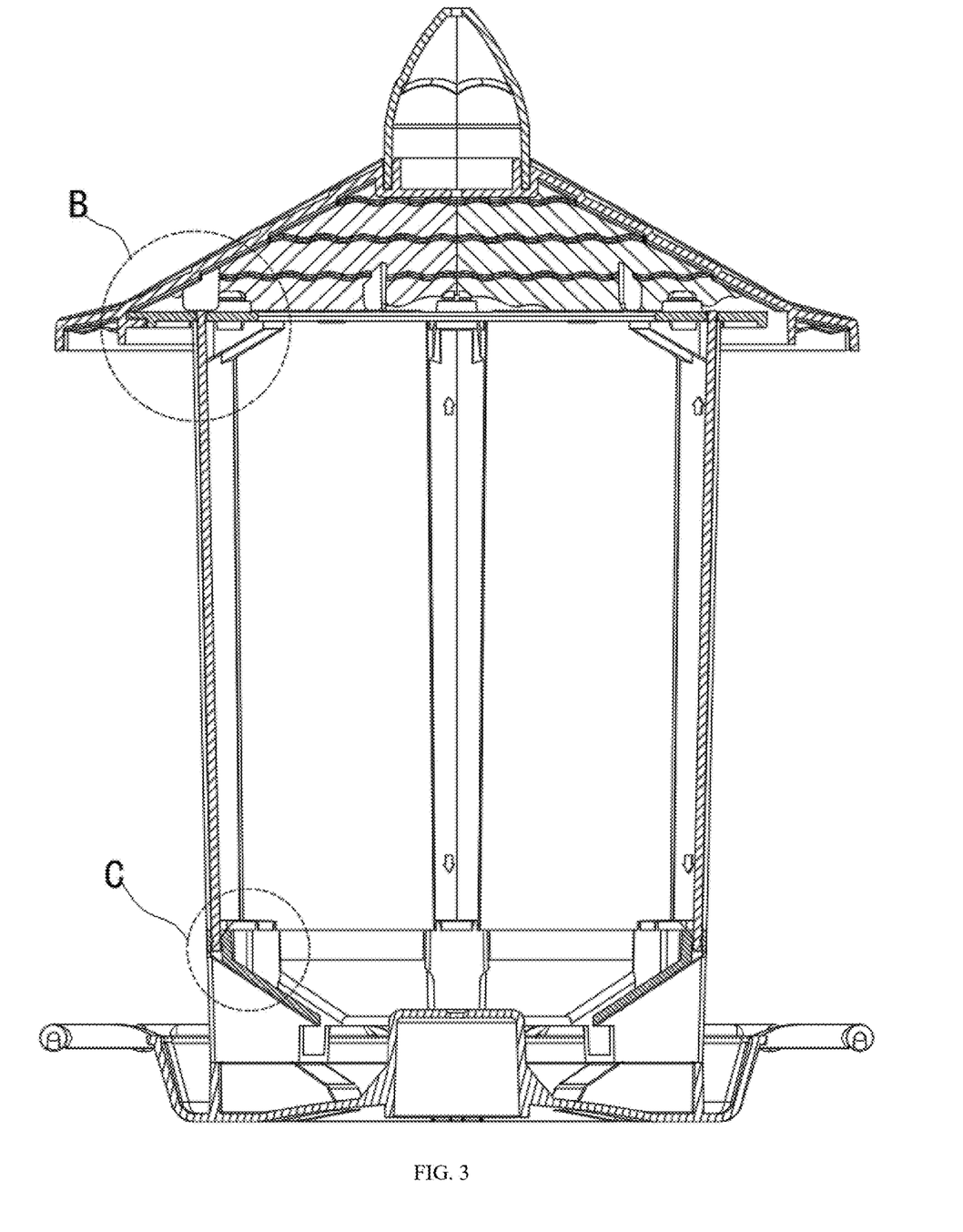
FIG. 3 is a sectional view of section A-A in FIG. 2 according to an example of the present disclosure.

Further, as shown in FIG. 1 and FIG. 6, a plurality of struts 212 are arranged at intervals on the periphery of the tray body 210, and the plurality of struts 212 are arranged in one-to-one correspondence with the plurality of feeding openings 230, such that when standing on the struts 212, the birds can eat the bird feed in the feeder through the feeding openings 230 corresponding to the struts 212. In addition, the top cover 310 of the cover assembly 300 may be provided with a hook or a lanyard, the feeder is hung conveniently, structural design is simple and novel, and use is convenient.

From the above description, it can be seen that the above-mentioned embodiments of the present disclosure achieve the following technical effects:

It can be seen that according to the bird feeder of this example, the barrel assembly 100 can be split into the plurality of upright posts 110 and the plurality of panels 120, such that space occupied by the bird feeder is reduced, and storage, package and transportation are convenient. During assembly, the plurality of upright posts 110 are inserted in the tray assembly 200 at intervals in a ring shape at first, and then the panels 120 are detachably inserted between every two adjacent upright posts 110 respectively, thus defining the barrel assembly 100. The tray assembly 200 is used for receiving and distributing the bird feeds in the barrel assembly 100, the tray assembly 200 includes at least one feeding opening 230 for distributing the bird feeds, such that the birds can eat the bird feeds through the feeding opening 230. In addition, the barrel assembly 100 and the tray assembly 200 can be split, and the barrel assembly 100 and the cover assembly 300 can be split, thus cleaning the interior of the bird feeder conveniently.

It should be understood that when an element is referred to as being "on" or "connected to" another element, it can be directly on the other element or directly connected to the other element or indirectly connected to the other element by an intervening element therebetween. On the contrary, when an element is referred to as being "directly on" or "directly connected to" another element, there are no intervening elements therebetween. Also, it should be noted that if directional indications (such as up, down, left, right, front, back, etc.) are involved in the embodiment of the present disclosure, the directional indications are only used to explain a relative position relationship, a movement condition and the like between various components under a certain posture (as shown in the accompanying drawings). If the specific posture changes, the directional indication changes accordingly.

The examples described above are merely preferred embodiments of the present disclosure. It shall be noted that those of ordinary skill in the art can make several improvements and polishing on the premise without deviating from principles of the present disclosure, and these improvements and polishing shall be considered to fall within the protection scope of the present disclosure.

What is claimed is:

1. A bird feeder, comprising:
    a barrel assembly used for containing bird feeds, wherein the barrel assembly comprises a plurality of upright posts arranged at intervals in a ring shape and a plurality of panels, and the panels are detachably inserted between every two adjacent upright posts respectively;
    a tray assembly, wherein the tray assembly is connected to a lower portion of the barrel assembly, the tray assembly is used for receiving and distributing the bird feeds in the barrel assembly, and the tray assembly comprises at least one feeding opening for distributing the bird feeds; and
    a cover assembly, wherein the cover assembly detachably covers an upper portion of the barrel assembly, and the cover assembly is used for preventing an object from entering the barrel assembly;
    wherein the cover assembly comprises a top cover and a ring cover that are detachably connected to each other; upper ends of the plurality of upright posts are detachably connected to the ring cover, and a plurality of second insertion recesses provided in a ring shape are provided in the ring cover; and the second insertion recesses are located between every two adjacent upright posts respectively, and upper ends of the panels are inserted into the second insertion recesses respectively;

wherein a ring wall extends at a lower portion of the top cover, a protruding buckle is arranged on the ring wall, a rotation snap-in recess is provided in an outer edge of the ring cover, and an end of the rotation snap-in recess is provided with an opening, such that the protruding buckle is rotationally snapped in the rotation snap-in recess through the opening by rotating the ring wall relative to the ring cover;

an inner wall of the rotation snap-in recess is provided with a concave portion, and the protruding buckle is correspondingly provided with a convex portion, the convex portion and the concave portion are in snap-fitted connection when the protruding buckle is rotationally snapped into a rotating slot.

2. The bird feeder according to claim 1, wherein a lower end of the upright post is provided with a first limit post, the first limit post is composed of a plurality of first elastic flaps arranged oppositely, a plurality of first limit holes provided at intervals in a ring shape are provided in the tray assembly, and the first limit posts of the plurality of upright posts are inserted into the plurality of first limit holes in one-to-one correspondence respectively.

3. The bird feeder according to claim 1, wherein an upper end of the upright post is provided with a second limit post, the second limit post is composed of a plurality of second elastic flaps arranged oppositely, a plurality of second limit holes provided at intervals in a ring shape are provided in the cover assembly, and the second limit posts of the plurality of upright posts are inserted into the plurality of second limit holes in one-to-one correspondence respectively.

4. The bird feeder according to claim 1, wherein a plurality of first insertion recesses provided in a ring shape are provided in the tray assembly, the first insertion recesses are provided between every two adjacent upright posts respectively, and lower ends of the panels are inserted into the first insertion recesses respectively.

5. The bird feeder according to claim 4, wherein one of the first insertion recess and the lower end of the panel is provided with a first convex buckle, the other one of the first insertion recess and the lower end of the panel is provided with a first recess, and the lower end of the panel is fixedly inserted into the first insertion recess through snap fitting between the first convex buckle and the first recess.

6. The bird feeder according to claim 1, wherein the second insertion recess is arranged through an upper surface and a lower surface of the ring cover, a plurality of protrusions arranged in a ring shape are arranged in the top cover, and the protrusions are pressed against the upper ends of the panels respectively.

7. The bird feeder according to claim 1, wherein a plurality of first snap-in portions arranged at intervals in a ring shape are arranged on the tray assembly, and the lower ends of the plurality of upright posts all protrude inwards to form first bumps, such that the first bumps are embedded in the first snap-in portions to position the upright posts.

8. The bird feeder according to claim 1, wherein the tray assembly comprises a tray body and a ring body that are detachably connected to each other, the barrel assembly is arranged on the ring body to form a plurality of feeding openings between the ring body and the tray body, and the plurality of feeding openings are provided around the ring body.

* * * * *